United States Patent
Rychlik

(10) Patent No.: US 7,844,804 B2
(45) Date of Patent: Nov. 30, 2010

(54) EXPANSION OF A STACKED REGISTER FILE USING SHADOW REGISTERS

(75) Inventor: Bohuslav Rychlik, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 11/271,545

(22) Filed: Nov. 10, 2005

(65) Prior Publication Data

US 2007/0106885 A1    May 10, 2007

(51) Int. Cl.
G06F 7/38    (2006.01)
G06F 9/00    (2006.01)

(52) U.S. Cl. .................................. 712/228; 712/E9.024
(58) Field of Classification Search .................. 712/228, 712/E9.024
See application file for complete search history.

(56) References Cited

U.S. PATENT DOCUMENTS

| | | | | |
|---|---|---|---|---|
| 4,429,363 A * | 1/1984 | Duke et al. | .................. | 711/122 |
| H001291 H | 2/1994 | Hinton et al. | | |
| 5,530,870 A * | 6/1996 | De Bruler | .................. | 717/155 |
| 6,078,970 A * | 6/2000 | Nordstrom et al. | ............ | 710/19 |
| 6,128,728 A * | 10/2000 | Dowling | .................. | 712/228 |
| 6,243,668 B1 * | 6/2001 | Le et al. | .................. | 703/27 |
| 6,263,401 B1 * | 7/2001 | Ross et al. | .................. | 711/109 |
| 6,314,513 B1 | 11/2001 | Ross et al. | | |
| 6,336,154 B1 * | 1/2002 | McCarthy et al. | ............. | 710/35 |
| 6,408,325 B1 * | 6/2002 | Shaylor | .................. | 718/108 |
| 6,487,630 B2 * | 11/2002 | Bui | .................. | 711/109 |
| 6,578,137 B2 * | 6/2003 | Parady | .................. | 712/228 |
| 6,631,452 B1 | 10/2003 | Lin | | |

(Continued)

FOREIGN PATENT DOCUMENTS

EP    0676691    10/1995

(Continued)

OTHER PUBLICATIONS

"Intel IA-64 Architecture software Developer's Manual" vol. 2: IA-64 System Architecture; Rev. 1.1, Jul. 2000. Pertinent pp. 6-1 to 6-16.*

(Continued)

*Primary Examiner*—Eddie P Chan
*Assistant Examiner*—Idriss N Alrobaye
(74) *Attorney, Agent, or Firm*—Peter M. Kamarchik; Nicholas J. Pauley; Sam Talpalastky

(57) ABSTRACT

One or more Shadow Register Files (SRF) are interposed between a Physical Register File (PRF) and a Backing Store (BS) in a shadow register file system. The SRFs comprise dual-port registers connected serially in a chain of arbitrary depth from the PRF. A Register Save Engine has random access to one port of the registers in the final SRF in the chain, and saves/restores data between the final SRF and the BS, e.g., RAM. As PRF registers are deallocated from calling procedures for use by called procedures, data are serially shifted from multi-port registers in the PRF through successive corresponding dual-port registers in SRFs, and are serially shifted back toward the multi-port registers as the PRF registers are reallocated to calling procedures. Since no procedure can access more than the number of registers in the PRF, the effective size of the PRF is increased, using less costly dual-port registers.

15 Claims, 5 Drawing Sheets

U.S. PATENT DOCUMENTS

| | | | |
|---|---|---|---|
| 6,665,793 | B1 | 12/2003 | Zahir et al. |
| 6,751,749 | B2 | 6/2004 | Hofstee et al. |
| 6,799,269 | B2 | 9/2004 | Dowling |
| 7,093,110 | B2 | 8/2006 | Okawa et al. |
| 7,127,592 | B2 | 10/2006 | Abraham et al. |
| 2002/0056024 | A1 | 5/2002 | Bui |
| 2002/0116662 | A1 | 8/2002 | Hofstee et al. |
| 2003/0051124 | A1* | 3/2003 | Dowling .................... 712/244 |
| 2004/0133766 | A1 | 7/2004 | Abraham et al. |
| 2006/0047921 | A1 | 3/2006 | Kumar |
| 2006/0294344 | A1* | 12/2006 | Hsu et al. .................. 712/228 |
| 2007/0094484 | A1 | 4/2007 | Rychlik |
| 2007/0106885 | A1 | 5/2007 | Rychlik |

FOREIGN PATENT DOCUMENTS

| | | |
|---|---|---|
| EP | 0955583 | 11/1999 |
| WO | WO9621186 | 7/1996 |
| WO | WO0182059 | 11/2001 |

OTHER PUBLICATIONS

Jaume Abella; Antonio Gonzales "On Reducing Register Pressure and Energy in Multiple-Banked Register Files".*

Jayaraj et al. "Shadow Register File Architecture: A mechanism to reduce context switch latency" Published: 2003, IEEE.*

"Microsoft Computer Dictionary, Fifth Edition" pertinent p. 76.*

"Intel IA-64 Architecture Software Developer's Manual" vol. 1: IA-64 Application Architecture; Rev. 1.1, Jul. 2000; pertinent pp. 3-2 to 3-6, 4-1 to 4-4.*

International Preliminary Report on Patentability-PCT/US06/060849, International Search Authority-European Patent Office-Jun. 20, 2008.

International Search Report-PCT/US06/060849, International Search Authority-European Patent Office-Jul. 4, 2007.

Written Opinion-PCT/U506/060849, International Search Authority-European Patent Office-Jul. 4, 2007.

* cited by examiner

EXPANSION OF A STACKED REGISTER FILE USING SHADOW REGISTERS

BACKGROUND

The present invention relates generally to the field of processors and in particular to expanding the effective size of a stacked register file using shadow registers.

RISC processors are characterized by relatively small instruction sets, wherein each instruction performs a single instruction, such as an arithmetic, logical, or load/store operation. Arithmetic and logical instructions obtain their operands from, and write their results to, one or more General Purpose Registers (GPR). GPRs are architected registers. That is, they comprise discrete memory locations explicitly identified in the instruction set architecture, and are directly addressed by instructions.

GPRs are often implemented in hardware as an array of high-speed, multi-ported registers, each having a word width defined by the instruction set (e.g., 32 or 64 bits). This array of physical registers is referred to as a Physical Register File. In a direct-mapped register implementation, the number of registers in the Physical Register File exactly matches the number of architected GPRs, and each logical GPR identifier maps to a specific hardware register. For higher performance, and to support superscalar pipelines, many modern processors decouple logical GPR identifiers from physical registers in the Physical Register File. Register renaming, reorder buffers, and the like are techniques known in the art for decoupling logical GPR identifiers from physical registers. Whether directly mapped or renamed, management of the Physical Register File across numerous software procedures is a design challenge, and is often a performance bottleneck.

Most modern software is modular in nature. That is, one procedure may "call," or transfer control to, another procedure (variously referred to as a function, subroutine, submodule, or the like). The called procedure may in turn call another procedure, and so on, resulting in procedure nesting, often to a considerable depth. During execution by a processor, each procedure (also referred to during execution as a context) is allocated certain processor resources, including a number of GPRs. The number of GPRs allocated to a procedure may be predetermined by a compiler's analysis of instructions in the procedure, and may range from a few GPRs to the full architected set of GPRs. When a first procedure calls a second procedure (also known as a context switch), the first, or calling, procedure goes inactive while the second, or called, procedure is allocated separate resources, including its own set of GPRs, and begins execution. When the second procedure completes execution, its resources are deallocated, resources are re-allocated to the calling procedure (if necessary), and the calling procedure resumes execution. A portion of the resources allocated by the calling procedure may optionally remain available to the called procedure, such as registers used to communicate call parameters and return values between the procedures.

In some prior art processors, such as for example the Intel i-960, a context switch, or new procedure, prompts the processor to store the entire contents of the Physical Register File to memory, making the entire Physical Register File available to the new procedure. When a called procedure completes execution and returns control to its calling procedure, the previously saved register values are restored to the Physical Register File, and execution of the calling procedure continues. The Physical Register File contents are saved to a "Backing Store," such as system memory (RAM). To mitigate the performance impact of multiple off-chip memory accesses for every context switch when the Backing Store comprises off-chip RAM, a processor may provide one or more "cache" register files—which may comprise actual registers or alternatively may comprise an on-chip cache memory—for storing the contents of the Physical Register File. However, the entire Physical Register File must be stored/retrieved at one time, imposing a performance hit, even in the case of cached register storage.

A technique employed by many modern processors such as the Intel Itanium, that obviates the need to store and retrieve the entire Physical Register File at one time, is known as a stacked register file architecture. In a stacked register file architecture, the high-level processor controller considers the Physical Register File to be a logical stack of infinite depth. This logically infinite stack is implemented in the Physical Register File by incrementally allocating registers to procedures as they are called, and saving the contents of previously allocated registers as necessary.

FIG. 1 depicts a functional block diagram of a representative stacked register file architecture implementation. The Physical Register File 1 comprises an array of high speed, multi-ported physical registers, the array including at least as many registers as there are GPRs in the instruction set architecture. For example, the Physical Register File 1 may comprise 128 registers, ranging from physical register 0 (PR0) at the bottom to physical register 127 (PR127) at the top. Two logical pointers implement stack management: a Top of Stack pointer and a Save/Restore pointer.

Initially, both pointers are set to PR0. As procedures are called and registers are allocated thereto, the Top of Stack pointer moves up. When all or nearly all available physical registers have been allocated, and a newly called procedure requires more registers than the number of unallocated registers remaining in the Physical Register File 1, the Top of Stack pointer will "wrap," and begin allocating registers from the bottom of the Physical Register File 1, beginning with PR0. Before this occurs, however, a sufficient number of registers at the bottom of the Physical Register File 1 must have their contents saved to a Backing Store 3, such as system memory (RAM).

A Register Save Engine 2 interrupts the processor, and executes the instructions necessary to perform register read and memory store operations to save the contents of the least-recently allocated registers at the bottom of the Physical Register File 1 to the Backing Store 3. The Register Save Engine 2 increments the Save/Restore pointer, indicating that registers below the pointer are available for allocation to newly called procedures. When the Register Save Engine 2 completes the register save operation and relinquishes control of the processor, the processor controller allocates registers to the next procedure, and increments the Top of Stack pointer, wrapping it and incrementing it past the registers whose contents were saved to the Backing Store 3, as those registers are re-allocated and utilized by the called procedure.

Similarly, as a called procedure completes execution and returns control to a calling procedure, the stack is popped, and the registers allocated to the called procedure are de-allocated, or made available for allocation to other procedures. If all data associated with the calling procedure is not still in the Physical Register File 1—that is, if one or more of the calling procedure's registers were re-allocated—the Register Save Engine 2 again interrupts the processor, retrieves the contents of the most recently saved registers from the Backing Store 3, restores the data to the Physical Register File 1, allocates the registers to the calling procedure, and increments the Save/Restore pointer to indicate that the registers are allocated and contain valid data.

The stacked register file system provides optimal performance with a large Physical Register File 1, with a relatively narrow depth of procedure nesting, and/or with relatively few registers allocated to each procedure. Under these conditions, the Top of Stack pointer simply moves up and down through the Physical Register File 1, allocating and de-allocating registers to procedures as needed, with no delay. However, as the depth of procedure nesting increases, and/or one or more procedures requires a large number of registers, the processor experiences numerous interruptions by the Register Save Engine 2, to save data from and restore it to registers in the Physical Register File 1, as physical registers are de-allocated from, and re-allocated to, calling procedures.

One way to increases performance of a stacked register file system is simply to increase the size of the Physical Register File 1. While this does provide higher performance, the registers in the Physical Register File 1 are usually high-speed, multi-ported random-access registers. Each register may include, e.g., three to five read and write ports. Furthermore, for flexibility in operation scheduling and register allocation, a read port of each physical register must be routed to each execution pipe stage in each pipeline, and the write-back pipe stage in each pipeline must be connected to a write port of each register in the Physical Register File. Thus, increasing the size of the Physical Register File 1 is costly in terms of both gate count and wiring complexity, with concomitant increases in testing and verification complexity and power consumption. At any given time, only one procedure is executing, usually accessing only a small subset of the registers in the Physical Register File 1. Thus, increasing the size of the Physical Register File 1 incurs significant costs, with low utilization of the costly hardware.

SUMMARY

In one or more embodiments, one or more Shadow Register Files are interposed between a Physical Register File comprising a plurality of multi-port registers and the Backing Store in a stacked register file architecture. The Shadow Register Files each comprise two-port registers, and are serially connected, forming a chain extending from each multi-port register in the Physical Register File. Data in multi-port registers allocated to inactive procedures are saved to corresponding dual-port registers in the first Shadow Register File. The data may subsequently be shifted to a second dual-port register in a second Shadow Register File, as newer data, associated with another inactive procedure, is saved from the multi-port register to the dual-port register in the first Shadow Register File. The chain of Shadow Register Files may be of arbitrary depth. A Register Save Engine saves and restores data to and from a Backing Store (such as off-chip RAM) from the last Shadow Register File in the chain, as necessary. As procedures are reactivated, data are shifted through the chain of Shadow Register Files, toward the multi-port registers of the Physical Register File.

One embodiment relates to a method of managing a shadow register file system having one or more Shadow Register Files. One or more multi-port registers from a Physical Register File are allocated to a first procedure, and data associated with the first procedure is stored in the allocated multi-port registers. Data associated with the first procedure are selectively saved from one or more multi-port registers to one or more first dual-port registers, and the corresponding allocated multi-port registers are released for allocation to a second procedure. Prior to continued execution of the first procedure, data associated with the first procedure are restored from the dual-port registers to the multi-port registers and the registers are re-allocated to the first procedure.

Another embodiment relates to a processor implementing an instruction set architecture defining a plurality of General Purpose Registers. The processor includes a Physical Register File comprising at least as many multi-port registers as the number of General Purpose Registers defined in the processor instruction set architecture, the registers dynamically allocated to software procedures. The processor also includes a Register Save Engine operative to selectively save data from multi-port registers allocated to inactive procedures and to restore data to the multi-port registers prior to the procedures becoming active. The processor further includes a first Shadow Register File comprising the same number of dual-port registers as multi-port registers in the Physical Register File. A first port of each dual-port register is directly connected to a corresponding multi-port register, and is operative to store data saved from the multi-port registers allocated to inactive procedures, under the control of the Register Save Engine.

DETAILED DESCRIPTION

Figure 1:
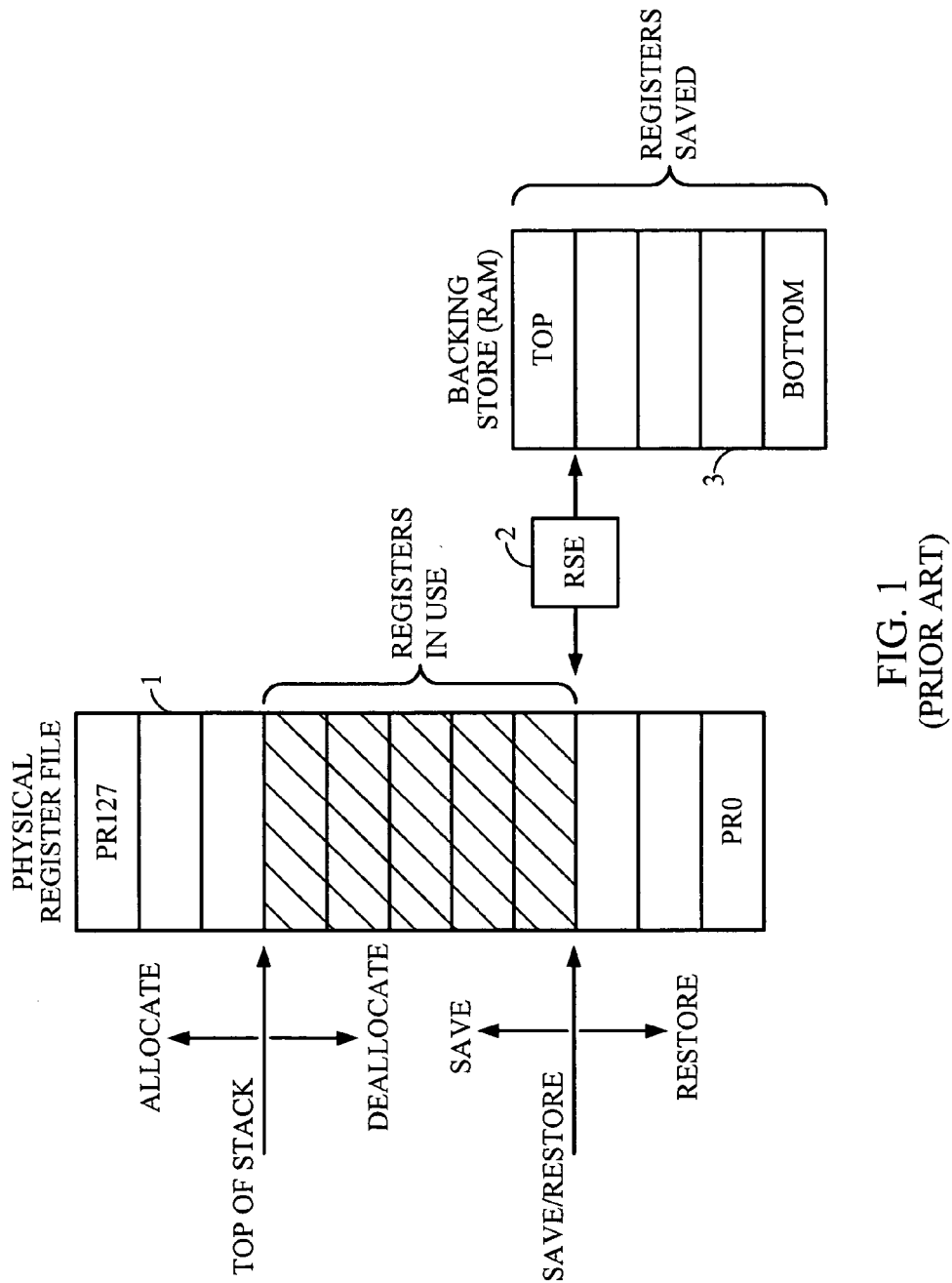
FIG. 1 is a block diagram of a prior art stacked register file.
Figure 2:
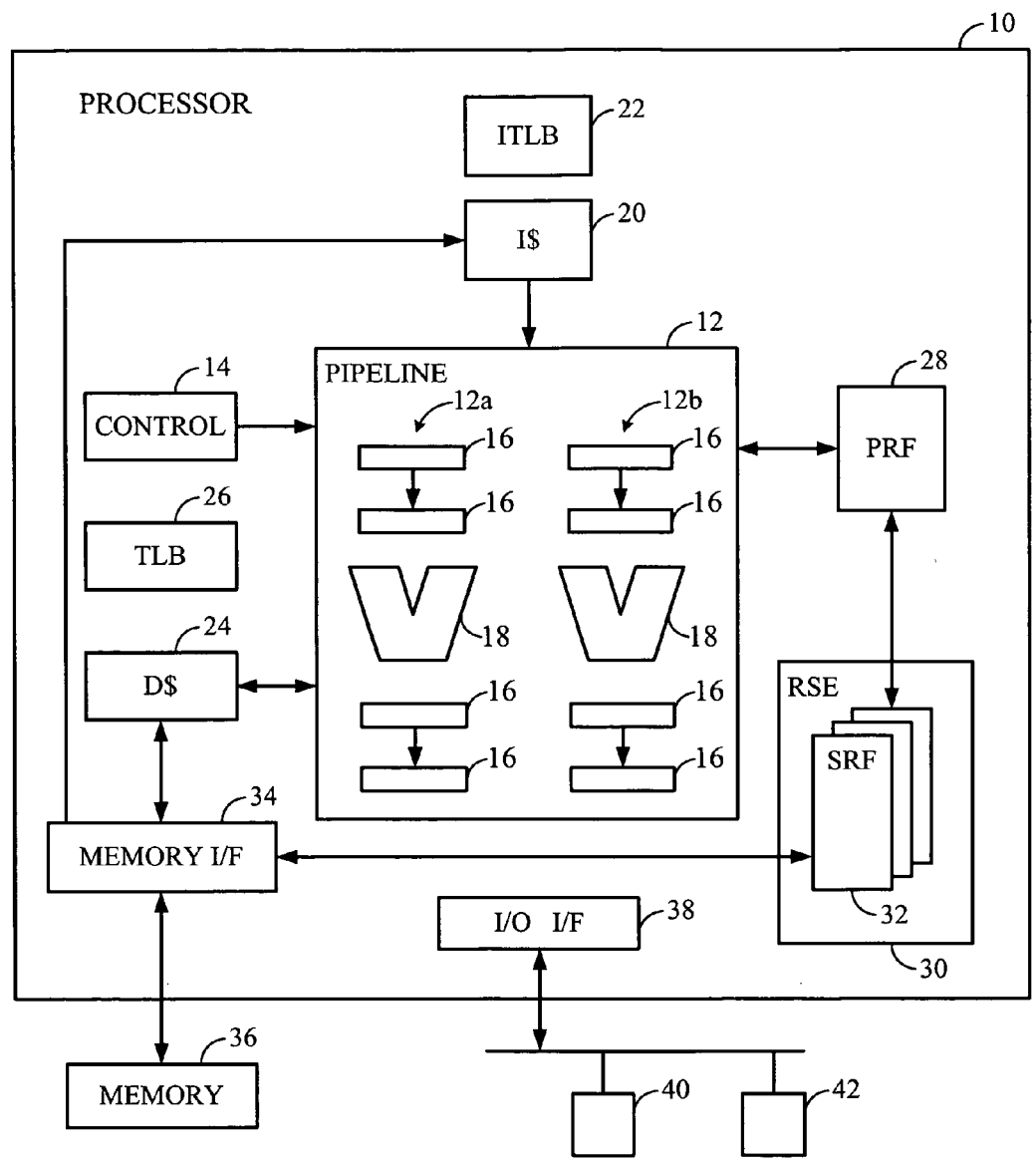
FIG. 2 is a functional block diagram of a processor.

FIG. 2 depicts a functional block diagram of a processor 10. The processor 10 executes instructions in an instruction execution pipeline 12 according to control logic 14. The pipeline 12 may be a superscalar design, with multiple parallel pipelines such as 12a and 12b. Each pipeline 12a, 12b includes various registers or latches 16, organized in pipe stages, and one or more Arithmetic Logic Units (ALU) 18. The pipelines 12a, 12b fetch instructions from an Instruction Cache (I-Cache or I$) 20, with memory addressing and permissions managed by an Instruction-side Translation Lookaside Buffer (ITLB) 22.

Data is accessed from a Data Cache (D-Cache or D$) 24, with memory addressing and permissions managed by a main Translation Lookaside Buffer (TLB) 26. In various embodiments, the ITLB 22 may comprise a copy of part of the TLB 26. Alternatively, the ITLB 22 and TLB 26 may be integrated. Similarly, in various embodiments of the processor 10, the I-cache 20 and D-cache 24 may be integrated, or unified. Misses in the I-cache 20 and/or the D-cache 24 cause an access to main (off-chip) memory 36, under the control of a memory interface 34.

Pipe stage registers or latches 16 and ALUs 18 may read operands from and/or write results to registers in a Physical Register File 28. The Physical Register File 28 is managed by a Register Save Engine 30, which also manages one or more Shadow Register Files 32. Data are transferred between one Shadow Register File 32 and main memory 36 via memory interface 34. The operation of the Physical Register File 28, Register Save Engine 30, and Shadow Register Files 32 are described in greater detail below.

The processor 10 may include an Input/Output (I/O) interface 38, controlling access to various peripheral devices 40, 42. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

Figure 3:
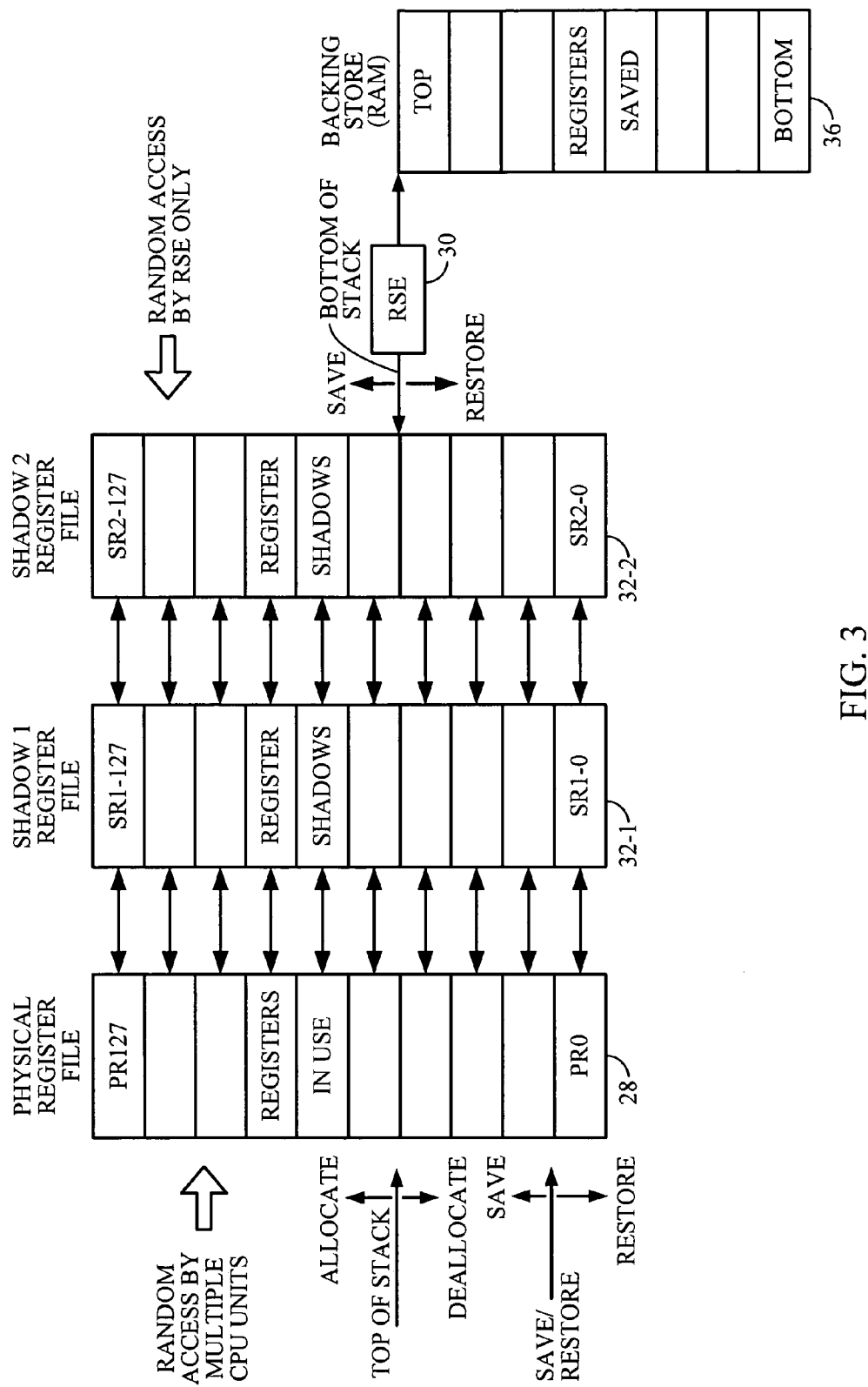
FIG. 3 is a functional block diagram of a stacked register file including a plurality of Shadow Register Files.

FIG. 3 depicts a functional block diagram of the stacked register file architecture of the processor 10. A logically infinite register stack is implemented in a Physical Register File 28, which includes at least as many multi-port physical registers as the processor's instruction set architecture defines GPRs; one or more Shadow Register Files 32, each of which contains the same number of dual-port registers as the Physical Register File 28 contains multi-port registers; and a Backing Store 36 of very large size. As used herein, a multi-port register is a storage location having three or more independent data read/write ports. A dual-port register is a storage location having two independent data read/write ports. Registers in the Physical Register File 28 are multi-ported, as data are written to and read from the registers by multiple pipeline stages, ALUs, and the like. Indeed, it is the complexity, silicon area, and wiring congestion of a large number of random-access multi-port registers that makes simple expansion of the Physical Register File 28 a costly approach to reducing latencies associated with saving its contents to a Backing Store 36.

Each multi-port register in the Physical Register File 28 is directly connected to a first port of a corresponding dual-port register in the Shadow 1 Register File 32-1. As depicted in FIG. 3, the second port of each dual-port register in the Shadow 1 Register File 32-1 is directly connected to a first port of a corresponding dual-port register in the Shadow 2 Register File 32-2. The second port of the dual-port registers in the Shadow 2 Register File 32-2 is randomly accessed by the Register Save Engine 30. Although FIG. 3 depicts two Shadow Register Files 32-1, 32-2, those of skill in the art will readily recognize that the number of serially connected Shadow Register Files 32-1, 32-2 may range from one to as many as desired. The set of registers including the Physical Register File 28 and all serially-connected Shadow Register Files 32 is referred to herein as the shadow register file system.

A Top of Stack pointer and Save/Restore pointer manage the availability of multi-port registers in the Physical Register File 28, as well as, in some embodiments, saving data to and restoring data from the last Shadow Register File 32-2. Both pointers are maintained by the Register Save Engine 30. In one embodiment, both pointers are initialized to the top of the register files. As multi-port registers in the Physical Register File 28 are allocated to newly called procedures, the Top of Stack pointer is incremented by the number of multi-port registers allocated. Registers at or below the Top of Stack pointer (and above the position of the Save/Restore pointer) are allocated to procedures and may contain program data, and registers above the Top of Stack pointer (and at or below the position of the Save/Restore pointer) are free for allocation to new procedures. This relationship holds even as the pointers "wrap" around the register files. When the Top of Stack and Save/Restore registers point to the same position with the register files, the Physical Register File 28 is full.

As a procedure completes execution and returns control to its calling procedure, the Top of Stack pointer is decremented by the number of registers that were allocated to the completed procedure. Registers below the Top of Stack pointer (and above the position of the Save/Restore pointer) hold data associated with the currently active procedure, and possibly data associated one or more procedures that are inactive, having called other procedures, but will be reactivated when the called procedure complete execution.

When a procedure is called and requests the allocation of more multi-port registers than the number of unallocated multi-port registers remaining in the Physical Register File 28, the Register Save Engine 30 saves data associated with inactive procedures—that is, data stored in multi-port registers that are allocated to inactive procedures (possibly including the calling procedure)—from the Physical Register File 28 to corresponding dual-port registers in the Shadow 1 Register File 32-1. This operation is referred to herein as "spilling" data. Since each multi-port register in the Physical Register File 28 is directly connected to a corresponding dual-port register in the Shadow 1 Register File 32-1, data associated with all inactive procedures may be saved from the Physical Register File 28 to the Shadow 1 Register File 32-1 in a single cycle, according to one embodiment.

However, reading a large number of multi-port registers and writing the same large number of dual-port registers in a single cycle may result in an undesirable power "spike." Consequently, in another embodiment, a more incremental approach to saving multi-port registers to dual-port registers may be employed. For example, whenever a predetermined number of multi-port registers storing data become inactive (i.e., their associated procedure(s) go inactive by calling another procedure), the data may be transferred to dual-port registers. The predetermined number of registers to be saved at a time—that is, the "granularity" of the multi-port register data save operations—may be tailored as required for specific implementations, and/or may be variable, such as by writing a value to a configuration register.

As called procedures complete execution, and their calling procedure is reactivated, the Top of Stack pointer moves down, freeing up multi-port registers associated with the completed, called procedure. As the Top of Stack pointer approaches the position of the Save/Restore pointer, data are restored to previously freed multi-port registers in the Physical Register File 28 from the Shadow 1 Register File 32-1. This operation is referred to herein as "filling" data. Again, the direct connection between the each multi-port and dual-port register allows a plurality of multi-port registers to be restored in a single cycle. The number of registers restored at a time may be a predetermined value, and in some embodiments may be variable. As data are restored, the Save/Restore pointer moves down accordingly.

As depicted in FIG. 3, the shadow register file system may include more than one Shadow Register File 32-1, 32-2. As data are spilled from the Physical Register File 28 to the Shadow 1 Register File 32-1, corresponding registers in the Shadow 1 Register File 32-1 may hold saved data. In this case, every time data are spilled from a multi-port register in the Physical Register File 28 to a dual-port register in the Shadow 1 Register File 32-1, saved data in the dual-port register is shifted into a corresponding dual-port register in the Shadow 2 Register File 32-2. Because the multi-port registers, Shadow 1 dual-port registers, and Shadow 2 dual-port registers are directly connected to dedicated read/write ports, a plurality of register spill operations may occur in a single cycle.

When data are filled, or restored, to one or more Physical Register File 28 multi-port registers from corresponding Shadow 1 Register File 32-1 dual-port registers, if saved data resides in corresponding Shadow 2 Register File 32-2 dual-port registers, they are restored to the Shadow 1 dual-port registers as part of the fill operation. Those of skill in the art will readily appreciate that Shadow Register Files 32 may be nested to any required or desired depth for a given implementation, e.g., from 1 to n, where n is any positive integer.

The Register Save Engine 30 spills, or saves, data from the n-th extant Shadow Register File (e.g., Shadow 2 Register File 32-2 in the shadow register file system depicted in FIG. 3) to the Backing Store 36, such as off-chip RAM. Unlike intermediate Shadow Register Files, whose two read/write ports per register are directly connected to other registers, the Register Save Engine 30 has random read/write access to the second port of the registers in the n-th Shadow Register File. In one embodiment, the Register Save Engine 30 saves data from registers in the n-th Shadow Register File 32-n as they are spilled out of the shadow register file system—that is, as data are "pushed" out of the register by data in the (n-1)-th Shadow Register File, as data are spilled from one or more multi-port registers in the Physical Register File 28.

The basic operation of the shadow register file system is depicted in an example below. Consider the shadow register file system of FIG. 3, but for brevity, each register file comprises only four registers. Initially, a first procedure (P1) requests and is allocated two multi-port registers in the Physical Register File (PRF) 28. The Top of Stack pointer (initialized to the top of the PRF 28) is incremented twice, and sits at the top of the "valid data" region of the PRF 28, which is the PRF 28 region at or below the Top of Stack pointer and above the Save/Restore pointer. Since no data have been spilled from the PRF 28, the Save/Restore pointer is unchanged from its initial position at the top of the register files. P1 writes data A and B to the two allocated multi-port registers:

TABLE 1

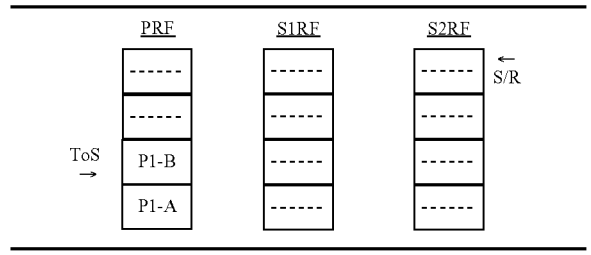

Procedure P1 calls a second procedure (P2), which requests three multi-port physical registers. Before three multi-port registers can be allocated to P2, at least some data associated with the now-inactive procedure P1 must be spilled to Shadow 1 Register File (S1RF) 32-1 dual-port registers. The Save/Restore pointer is incremented, to indicate a save (spill) operation from the PRF 28. P2 then saves data C-E, and the Top of Stack pointer wraps. Since there are no registers above the Top of Stack pointer but below the Save/Restore pointer, there is no free space in the PRF:

TABLE 2

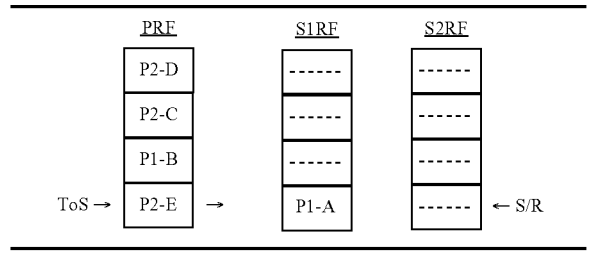

Procedure P2 calls a third procedure (P3), which requests two physical registers. Data is spilled from two multi-port registers in the PRF 28 to S1RF 32-1, and the Save/Restore pointer is incremented twice. P3 is allocated two multi-port registers, the Top of Stack pointer is incremented twice, and P3 saves data F and G:

TABLE 3

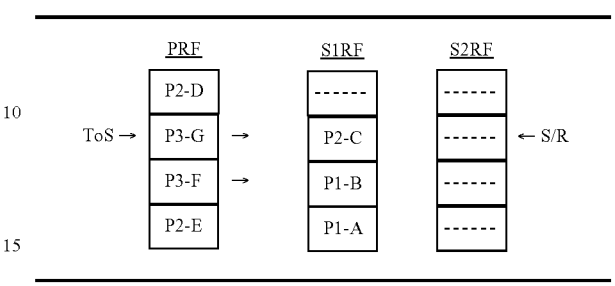

Procedure P3 calls a fourth procedure (P4), which requests three physical registers. Data are spilled from two PRF 28 multi-port registers into three corresponding S1RF 32-1 dual-port registers. This causes data from one S1RF 32-1 dual-port register to spill into a corresponding Shadow 2 Register File (S2RF) 32-2 dual-port register. The Save/Restore pointer is incremented three times (and wraps). P4 saves data H-J, and the Top of Stack is incremented three times (and wraps):

TABLE 4

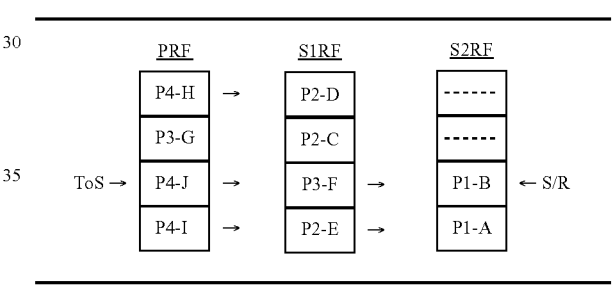

Procedure P4 calls a fifth procedure (P5), which requests three physical registers. Because more multi-port registers were requested than there are free registers in the S2RF 32-2, the Register Save Engine 30 must spill data from at least one dual-port register in the S2RF 32-2 to the Backing Store 36. Following this save operation, data are spilled from three PRF 28 registers, with the following results:

TABLE 5

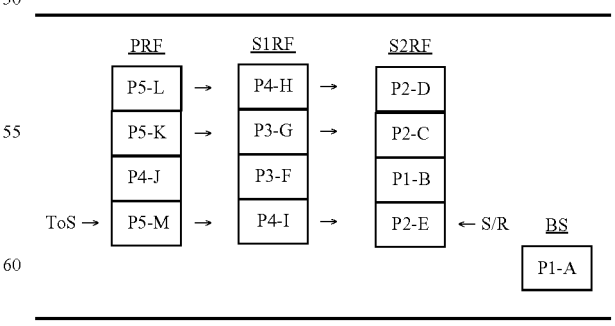

A sixth procedure (P6) requests two registers, causing two more spills from the stacked register file to the Backing Store 36:

TABLE 6

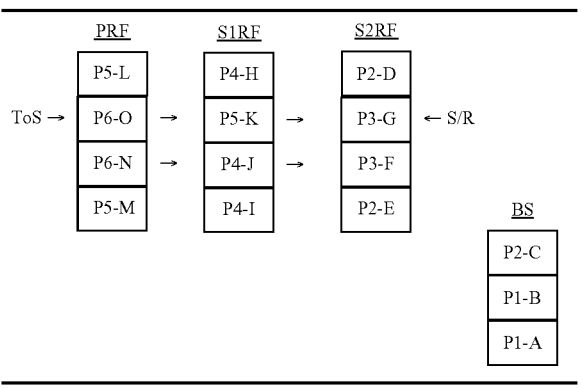

In the embodiment depicted, data spilled from the S2RF 32-2 to the BS 36 are stored in a logical stack, or LIFO data structure. However, the present invention is not limited to such a structure. In general, the Register Save Engine 30 may store spilled data in the BS 36 in any form or structure, so long as it tracks the data, and is able to fill the shadow register file system with a saved data in the reverse order from which it was spilled.

Next, procedure P6 completes execution, and returns control to its calling procedure P5. The PRF 28 multi-port registers containing data O and N associated with P6 are deallocated by decrementing the Top of Stack pointer twice. This causes data stored in the corresponding positions of S1RF 32-1 and S2RF 32-2 to fill. This, in turn, causes the Register Save Engine 30 to fill the corresponding positions of S2RF 32-2 with data from the BS 36, beginning at the position of the Save/Restore pointer and decrementing for each register filled. Following this register fill operation, the Top of Stack pointer and Save/Restore pointer again address the same entry in the shadow register file system, indicating that the PRF 28 is full:

TABLE 6

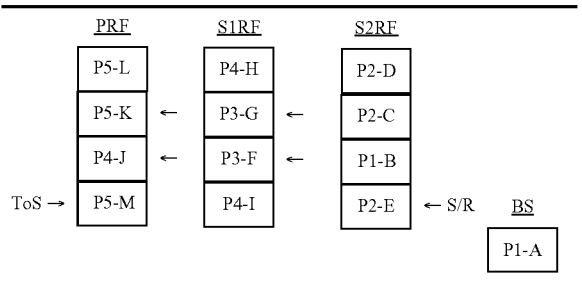

As procedures complete and return control to their calling procedures, multi-port registers in the PRF 28 are deallocated, and data fills from the S1RF 32-1 to the PRF 28, from the S2RF 32-2 to the S1RF 32-1, and from the BS 36 to the S2RF 32-2. Following the return of each called procedure, the state of the shadow register file system will be in the reverse order as depicted above (e.g., Tables 4, 3, 2, and 1).

For efficient operation, the Register Save Engine 30 tracks the contents of the shadow register file system. For example, in the spill operations depicted in Tables 2, 3, and 4, the Register Save Engine 30 should not spill data from the n-th Shadow Register File 32 to the Backing Store 36. However, in the spill operations depicted in Tables 5 and 6, it must. In one embodiment, the Register Save Engine 30 maintains a global Bottom of Stack pointer by counting the number of data spills from the Physical Register File 28, and decrementing for data fills. By dividing this count modulo the register file size, the Register Save Engine 30 can readily ascertain the "end" of the chain of data being spilled from the Physical Register File 28.

In another embodiment, the Register Save Engine 30 may determine the necessary operations from the number of registers being allocated, the position of the Save/Restore pointer, and whether or not the preceding register file in the chain is full. In this embodiment, a FULL status bit is associated with each register file (e.g., PRF 28, S1RF 32-1, S2RF 32-2, . . . SnRF 32-*n*). The bit is set whenever the respective register file is full, and is reset when the register file has free registers available to store new data. For example, in Table 2, the Shadow 1 Register File 32-1 is not full. Thus, the Register Save Engine 30 knows that no spill to Backing Store 36 will be necessary for the next register allocation, since no procedure can be allocated more than the number of registers in the Physical Register File 28.

In the embodiment of the above example, data are spilled from the Physical Register File 28 only on an "as needed" basis. That is, when a called procedure requests three registers, and the Physical Register File 28 is full, only three registers are spilled to the Shadow 1 Register File 32-1 (and further through the shadow register file system, as required). When the shadow register file system is full (i.e., the Physical Register File 28 and all Shadow Register Files 32 are full), a spill to the Backing Store 36 is required for each new register allocation. This imposes the delay associated with an off-chip RAM access on each procedure call and return, once the on-chip stacked register file system is full. While this method of shadow register file system management is fully functional and provides correct results, it may be sub-optimal.

In another embodiment, whenever insufficient unallocated multi-port registers exist in the Physical Register File 28 to satisfy a called procedure register allocation request, all data associated with inactive procedures may be spilled en mass to the Shadow 1 Register File 32-1 (and subsequently as required down the Shadow Register File 32 chain). If the n-th Shadow Register File contains valid data, the Register Save Engine 30 may have to spill data to the Backing Store 36, imposing a memory access delay on the procedure call. However, significant empty space would remain in the Physical Register File 28, and subsequently called procedures may be allocated multi-port registers immediately.

In another embodiment, where an en mass spilling may induce an undesired power spike, data may be spilled from the Physical Register File 28 whenever a predetermined number of multi-port registers in the Physical Register File 28 contain data associated with inactive procedures. This predetermined number may be fixed, or it may be user-specified, such as by writing a value to a configuration register. In this embodiment, while the allocation of multi-port registers in the Physical Register File 28 to a newly called procedure, and the concomitant inactivation of the calling procedure, is the trigger that initiates the spill operation (by causing the predetermined number of the registers associated with inactive procedures to be met or exceeded), the spill need not be completed to proceed with the allocation of multi-port registers to the newly called procedure. That is, the spill operation (incrementing the Save/Restore pointer) is decoupled from the multi-port register allocation (incrementing the Top of Stack pointer). This allows the spill operation to proceed as a "background" task, such as by a low-priority request to the memory interface 34 that is only serviced when sufficient memory access bandwidth is available. Into this case, space in the shadow register file system is made available for the allocation of multi-port physical registers to newly called procedures, while imposing minimal impact on system performance.

According to another embodiment, to further minimize the impact of accesses to the Backing Store 36, the Register Save Engine 30 may spill and fill the n-th Shadow Register File 32 without regard to the contents of the Physical Register File 28. If the Register Save Engine 30 anticipates a large number of procedure calls, or calls to procedures that require a large number of physical registers, it may aggressively spill the n-th Shadow Register File 32, to ensure ample space in the on-chip shadow register file system such that no procedure will incur the memory access latency associated with spill operations to the Backing Store 36. Alternatively, if the Register Save Engine 30 anticipates a large number of procedure returns, or returns to calling procedures that have been allocated a large number of physical registers, it may aggressively fill the n-th Shadow Register File 32, to ensure ample data in the shadow register file system such that no procedure will incur the memory access latency associated with fill operations from the Backing Store 36.

In this embodiment, the Register Save Engine 30 may separately track the spill/fill point of the n-th Shadow Register File 32 using the global Bottom of Stack pointer described above. Alternatively, the Bottom of Stack pointer may track only the spill/fill point within the n-th Shadow Register File 32, and rely on the FULL indicator associated with the (n-1)-th Shadow Register File 32 to identify data spills into the n-th Shadow Register File 32. In either case, due to random access of the second port of the dual-port registers of the n-th Shadow Register File 32, the Register Save Engine 30 may spill and fill data between the n-th Shadow Register File 32 and the Backing Store 36 independently of the allocation of multi-port registers in the Physical Register File 28.

Figure 4:
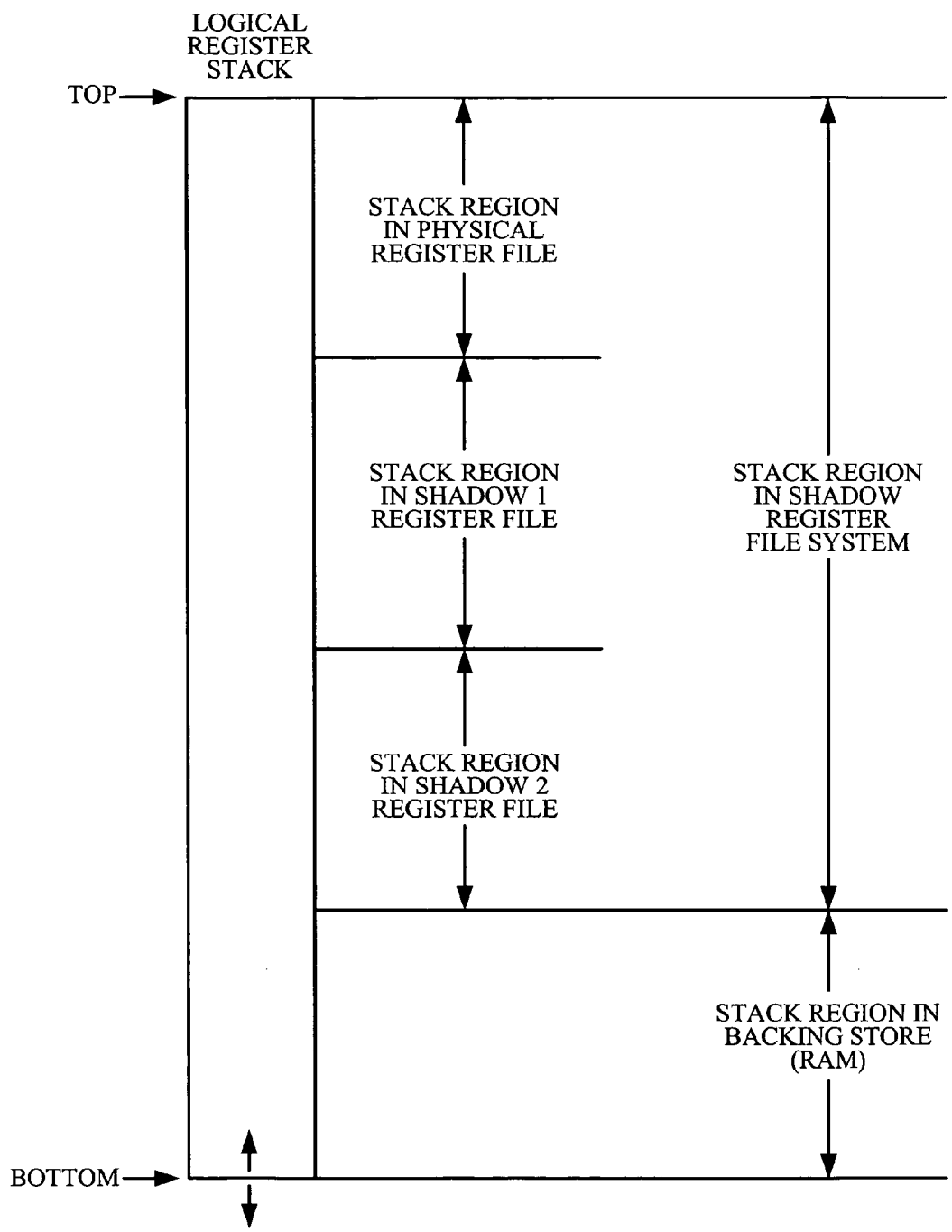
FIG. 4 is a logical view of a stacked register file system.

FIG. 4 depicts a logical view of the stacked register file system and its physical implementation (in the embodiment depicted in FIG. 3). The stacked register file system operates as a logical stack of multi-port registers of infinite depth. Since each procedure may access only as many registers as there are GPRs defined in the instruction set architecture, and the Physical Register File 28 is at least that size, the registers directly accessed by procedures are multi-port registers. Below the Physical Register File in the logical register stack are dual-port registers in the Shadow Register Files 32. The shadow register file system comprises the Physical Register File 28 and all of the Shadow Register Files 32. These are on-chip registers, from which data may be accessed with minimal delay. At the bottom of the logical register stack are data saved to the Backing Store 36, such as off-chip RAM.

Note that the depth of the logical register stack implemented in on-chip registers is an integral multiple of the size of the Physical Register File 28 (3× in the embodiment depicted). At least half of these registers (⅔ of them in the embodiment depicted) are simple, direct-connected, dual-port registers. However, the shadow register file system provides performance very nearly that achievable by the more costly option of multiplying the size of the Physical Register File 28 using multi-port registers.

The one-to-one correspondence and directly coupled linking of each multi-port register in the Physical Register File 28 to one or more dual-port registers in Shadow Register Files 32 allows the shadow register file system to be divided into banks, with each Physical Register File 28 bank having an expanded effective depth by operation of the spill and fill operations as described above. For example, in certain applications, such as battery-powered portable electronic devices, where power consumption is critical, it is known to "power-down" one or more banks of the Physical Register File 28.

The shadow register file system, using Shadow Register Files 32, fully supports such a power-saving strategy. Each Shadow Register File 32 may be divided into banks corresponding to those of the Physical Register File 28, and one or more Shadow Register File 32 banks may be powered-down along with any corresponding Physical Register File 28 banks. In the operational banks, the Top of Stack, Save/Restore, and (if present) Bottom of Stack pointers operate as described above, within the confines of a bank. Data are saved from one or more multi-port registers to corresponding dual-port registers, to increase the effective depth of the operational bank of the Physical Register File 28, without implementing additional, expensive multi-port registers.

Figure 5:
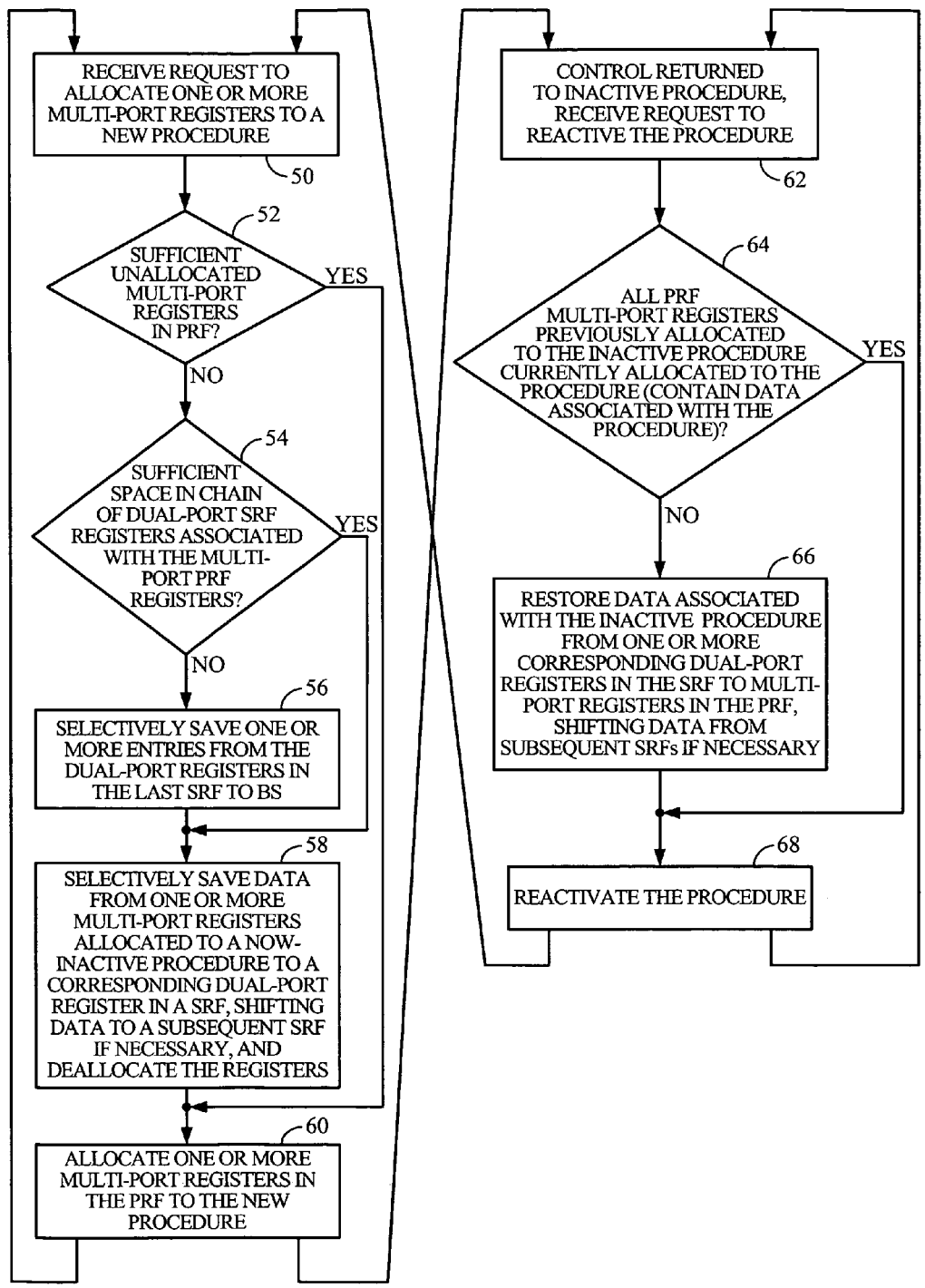
FIG. 5 is flow diagram of a method of managing a stacked register file architecture.

A method of operating a stacked register file system according to one embodiment is depicted in flow diagram form in FIG. 5. The Register Save Engine 30 receives a request to allocate one or more multi-port registers in the Physical Register File 28 for exclusive use by a newly called procedure to write and read data, such as operands for, or results of, arithmetic or logical instructions (block 50). The Register Save Engine 30 determines whether there are sufficient unallocated registers remaining in the Physical Register File 28 (block 52). Initially, there are, and the requested number of Physical Register File 28 multi-port registers is allocated to the new procedure (block 60). This process may repeat several times, as each procedure calls a successive procedure (block 50).

At some point, a procedure is called and multi-port register allocation requested (block 50), but insufficient unallocated multi-port registers remain in the Physical Register File 28 to satisfy the request (block 52). The Register Save Engine 30 then determines which registers in the Physical Register File 28 must be freed up to satisfy the request, and whether the corresponding dual-port registers at the end of the chain of Shadow Register Files 32 are free (block 54). If so, at least a sufficient number of multi-port registers that are allocated to one or more currently inactive procedures are de-allocated by saving their contents to corresponding, directly-connected dual-port registers in a Shadow Register File 32 (block 58). Any data in the dual-port registers are spilled to the dual-port registers in a subsequent Shadow Register File 32, and so on down the chain. The Register Save Engine 30 then allocates these de-allocated registers, along with existing de-allocated registers in the Physical Register File 28, to the requesting new procedure (block 60), which may proceed with execution and store data in its allocated Physical Register File 28 multi-port registers.

If sufficient new procedures are called, and/or if the new procedures require large allocations of registers, data may be spilled out to the last, or n-th Shadow Register File 32. In this case, upon a request by a new procedure (block 50), if the dual-port registers in the n-th Shadow Register File 32 that correspond to the multi-port registers in the Physical Register File 28 to be allocated contain valid data (block 54), the Register Save Engine 30 will spill the data to the Backing Store 36, such as off-chip RAM (block 56). Data may then be saved from multi-port registers in the Physical Register File 28 to corresponding dual-port registers in the Shadow Register Files 32 (block 58), and the freed Physical Register File 28 multi-port registers allocated to the new procedure (block 60). This process may repeat as new procedures are called (block 50).

At some point, rather than calling a new procedure (block 50), an active procedure will terminate, and return control to its calling procedure, which will request reactivation (block 62). The Register Save Engine 30 will check to determine if all registers originally allocated to the inactive procedure remain allocated to it in the Physical Register File 28 (block 64). If so, all the data written by the procedure, before it called another procedure and became inactive, remains in the Physical Register File 64 and the procedure may reactivate and resume execution (block 68).

If the Register Save Engine 30 spilled data from one or more multi-port registers originally allocated to the inactive procedure into corresponding dual-port registers, and allocated the multi-port registers to another procedure, the Register Save Engine 30 fills the Physical Register File 28 by shifting the data stored in corresponding Shadow Register File 32 two-port registers (block 64). The inactive procedure is then reactivated (block 68). Data may be filled to the n-th Shadow Register File 32 from the Backing Store 36.

The shadow register file system, utilizing Shadow Register Files 32, increases processor performance by reducing the number of times that the processor must be interrupted for save/restore operations to the Backing Store 36 for the Physical Register File 28. This results in faster register allocation/deallocation on software procedure calls/returns, as well as reducing the required number of relatively slow off-chip memory accesses.

The shadow register file system, utilizing Shadow Register Files 32, also saves power by reducing off-chip memory accesses, and by driving shorter wires through the use of simple, dual-port registers, as compared with the multi-port registers of the Physical Register File 28.

In one embodiment, to maximize the speed of register spill/fill operations and minimize power consumption, the dual-port registers in the Shadow 1 Register Files 32-1 are physically placed directly adjacent to corresponding multi-port registers in the Physical Register File 28, and directly connected. Similarly, the dual-port registers in the Shadow 2 Register File 32-2 are physically placed directly adjacent to corresponding dual-port registers in the Shadow 1 Register File 32-1, and directly connected. In fact, in one embodiment, each "row" of corresponding multi-port and dual-port registers is designed as a unit to be placed and routed on the chip. This ensures a direct connection, with minimum wire length, between each corresponding register (as opposed to designing the Physical Register File 28 and Shadow Register Files 32 as separate units, in which case the connections between them may be routed using longer wire lengths over greater silicon area).

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of managing a shadow register file system having one or more shadow register files, comprising:

allocating to a first procedure or one or more multi-port registers from a physical register file to which a portion of a logical register stack is mapped that is being used by the first procedure, and storing data associated with the first procedure in the allocated multi-port registers;

selectively saving data associated with the first procedure from the one or more multi-port registers to one or more registers of a first shadow register file of a shadow register file system, the one or more registers having independent data read/write ports, and releasing the corresponding allocated multi-port registers for allocation to a second procedure;

saving the data associated with the first procedure from the first shadow register file to a second shadow register file of the shadow register file system;

storing at least a portion of the data associated with the first procedure froma particular register of the second shadow register file to a backing store, and subsequently retrieving the portion of the data associated with the first procedure from the backing store to the particular register of the second shadow register file;

retrieving the data from the second shadow register file to the one or more registers of the first shadow register file; and prior to continued execution of the first procedure, restoring data associated with the first procedure from the one or more registers to the one or more multi-port registers and re-allocating the one or more multi-port registers to the first procedure.

2. The method of claim 1 wherein each multi-port register is directly connected to a first port of a corresponding dual-port register of the shadow register file system.

3. The method of claim 1 wherein the portion of the data is saved to the particular register via a first port of the particular register, and wherein saving the portion of the data associated with the first procedure from the particular register to the backing store comprises reading from a second port of the particular register.

4. The method of claim 1 wherein retrieving the data associated with the first procedure from the backing store to the particular register is performed by a register save engine having random read/write access to the one or more registers of the shadow resiter file.

5. The method of claim 1 wherein a second port of each of the one or more registers is directly connected to a first port of a corresponding register of the second shadow register file.

6. The method of claim 1 wherein saving data from and retrieving data to registers of the second register file is performed independently of multi-port register allocation.

7. The method of claim 1 wherein saving data associated with the first procedure from registers of the second shadow register file to a backing store comprises reading data associated with the first procedure from a second port of each register of the second shadow register file, and writing the data to the backing store.

8. The method of claim 1 wherein retrieving the data associated with the first procedure from the backing store to registers of the second shadow register file comprises reading data associated with the first procedure from the backing store, and writing the data to a second port of the same register of the second shadow register file from which the data was read.

9. The method of claim 1 wherein selectively saving data associated wit the first procedure from one or more multi-port registers to one or more registers comprises saving data associated with the first procedure to the one or more registers only when insufficient un-allocated registers remain among the multi-port registers to allocate to the second procedure.

10. The method of claim 1 wherein selectively saving data associated with the first procedure from one or more multi-port registers to one or more registers comprises saving only data associated with the first procedure to the one or more registers.

11. The method of claim 1 wherein selectively saving data associated with the first procedure from one or more multi-port registers to one or more registers comprises saving data associated with the first procedure and additionally data with one or more procedures executed prior to the first procedure, to the one or more registers.

12. The method of claim 11 wherein selectively saving data associated with the first procedure and one or more prior procedures comprises saving the data when a predetermined number of multi-port registers contain data associated with inactive procedures.

13. The method of claim 11 wherein selectively saving data associated with the first procedure and one or more prior procedures comprises saving all data in multi-port registers associated with inactive procedures.

14. The method of claim 1 further comprising:
dividing the physical register file and corresponding dual-port registers into two or more banks;
powering-down at least one bank; and
allocating operative multi-port registers, storing data in the operative multi-port registers, selectively saving data to operative dual-port registers, releasing the operative multi-port registers for allocation, restoring the data from the operative dual-port registers to the multi-port registers, and re-allocating the operative multi-port registers in one or more operative banks.

15. An apparatus for managing a shadow register file system having one or more register files, comprising:
means for allocating to a first procedure one or more multi-port registers from a physical register file to which a portion of a logical register stack is mapped that is being used by the first procedure, and storing data associated with the first procedure in the allocated multi-port registers;
means for selectively saving data associated with the first procedure from one or more multi-port registers to one or more dual-port registers of a first shadow register file having independent data read/write ports when a predetermined number of the multi-port registers become inactive, and releasing the corresponding allocated multi-port registers for allocation to a second procedure, wherein the predetermined number is determined by a writable value at a configuration register;
means for saving the data from the one or more dual-port registers of the first shadow register file to corresponding of a second shadow register file;
means for selectively saving the data from the corresponding registers of the second shadow register file to a backing store and for retrieving the data from the backing store to the second shadow register file; and
means for prior continued execution of the first procedure, restoring data associated with the first procedure from the corresponding registers of the second shadow register file to the one or more dual-port registers of the first shadow register file and for restoring the data from the one or more dual-port registers to the multi-port registers and re-allocating the multi-port registers to the first procedure.

* * * * *